(12) United States Patent
Shinbach et al.

(10) Patent No.: US 7,767,629 B2
(45) Date of Patent: *Aug. 3, 2010

(54) DRILLING FLUID CONTAINING MICROSPHERES AND USE THEREOF

(75) Inventors: Madeline P. Shinbach, St. Paul, MN (US); Domasius Nwabunma, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 271 days.

This patent is subject to a terminal disclaimer.

(21) Appl. No.: 11/867,482

(22) Filed: Oct. 4, 2007

(65) Prior Publication Data

US 2008/0026956 A1    Jan. 31, 2008

Related U.S. Application Data

(63) Continuation-in-part of application No. 11/036,712, filed on Jan. 14, 2005, now abandoned, which is a continuation of application No. 10/218,962, filed on Aug. 14, 2002, now Pat. No. 6,906,009.

(51) Int. Cl.
  *C09K 8/12* (2006.01)
  *C09K 8/22* (2006.01)
  *C09K 8/32* (2006.01)
  *E21B 43/267* (2006.01)

(52) U.S. Cl. ............... 507/119; 507/117; 507/118; 166/280.2

(58) Field of Classification Search ............ 507/117, 507/118, 119, 123, 125; 166/280.2
See application file for complete search history.

(56) References Cited

U.S. PATENT DOCUMENTS

| | | |
|---|---|---|
| 2,978,340 A | 4/1961 | Veatch et al. |
| 3,030,215 A | 4/1962 | Veatch et al. |
| 3,129,086 A | 4/1964 | Veatch et al. |
| 3,230,064 A | 1/1966 | Veatch et al. |
| 3,365,315 A | 1/1968 | Beck et al. |
| 3,472,798 A | 10/1969 | Pitchforth, Jr. et al. |
| 3,615,972 A | 10/1971 | Morehouse, Jr. et al. |
| 3,669,912 A * | 6/1972 | Hinton ............ 523/209 |
| 3,726,850 A | 4/1973 | Detroit |
| 3,740,359 A | 6/1973 | Garner |
| 3,746,109 A | 7/1973 | Darley |
| 3,792,136 A | 2/1974 | Schmitt |
| 3,945,956 A | 3/1976 | Garner |
| 4,039,480 A | 8/1977 | Watson et al. |
| 4,045,357 A | 8/1977 | Reed |
| 4,075,138 A | 2/1978 | Garner |
| 4,111,713 A | 9/1978 | Beck |
| 4,279,632 A | 7/1981 | Frosch et al. |
| 4,318,766 A | 3/1982 | Smith |
| 4,391,646 A | 7/1983 | Howell |
| 4,421,562 A | 12/1983 | Sands |
| 4,493,875 A | 1/1985 | Beck et al. |
| 4,587,291 A | 5/1986 | Gardziella et al. |
| 4,637,990 A | 1/1987 | Torobin |
| 4,652,274 A | 3/1987 | Boettcher et al. |
| 4,735,632 A | 4/1988 | Oxman et al. |
| 4,744,831 A | 5/1988 | Beck |
| 4,751,138 A | 6/1988 | Tumey et al. |
| 4,767,726 A | 8/1988 | Marshall |
| 4,799,549 A | 1/1989 | Vinot et al. |
| 4,903,440 A | 2/1990 | Larson et al. |
| 4,944,905 A | 7/1990 | Gibb et al. |
| 4,985,340 A | 1/1991 | Palazzotto et al. |
| 5,077,241 A | 12/1991 | Moh et al. |
| 5,089,536 A | 2/1992 | Palazzotto |
| 5,212,214 A | 5/1993 | Kallenbach |
| 5,236,472 A | 8/1993 | Kirk et al. |
| 5,333,698 A | 8/1994 | Van Slyke |
| 5,374,361 A | 12/1994 | Chan |
| 5,399,548 A | 3/1995 | Patel |
| 5,973,031 A | 10/1999 | Oram |
| 6,152,227 A | 11/2000 | Lawson et al. |
| 6,336,505 B1 | 1/2002 | Reddy |
| 6,365,268 B1 | 4/2002 | Williams et al. |
| 6,530,437 B2 | 3/2003 | Maurer et al. |

(Continued)

FOREIGN PATENT DOCUMENTS

CA    2148969    11/1996

(Continued)

OTHER PUBLICATIONS

American Petroleum Institute Standard RP 56, 60:1995, Frac Sand Sphericity and Roundness.

(Continued)

*Primary Examiner*—Timothy J. Kugel
*Assistant Examiner*—Aiqun Li
(74) *Attorney, Agent, or Firm*—Kent S. Kokko

(57) ABSTRACT

The present invention provides a drilling fluid composition and a method of drilling comprising a drilling fluid, which may be oil- or water-based, and a composite microsphere component. The invention drilling fluid composition advantageously reduces the density of a conventional fluid, reduces costs associated with pumping and overcomes problems associated with conventional gas-injection processes. The invention uses conventional drilling and pumping equipment, requires no sea-floor based pumps and may be easily pressure-controlled to maintain the pressure of the fluid.

19 Claims, No Drawings

U.S. PATENT DOCUMENTS

| | | |
|---|---|---|
| 6,582,819 B2 | 6/2003 | McDaniel et al. |
| 6,640,898 B2 * | 11/2003 | Lord et al. .................. 166/300 |
| 6,906,009 B2 | 6/2005 | Shinbach et al. |
| 2002/0048676 A1 | 4/2002 | McDaniel et al. |
| 2003/0130134 A1 | 7/2003 | Oram |
| 2003/0220204 A1 | 11/2003 | Baran, Jr. et al. |
| 2004/0026833 A1 | 2/2004 | Culler et al. |
| 2004/0089591 A1 | 5/2004 | Marcotullio et al. |

FOREIGN PATENT DOCUMENTS

| | | |
|---|---|---|
| EP | 0 091 555 A1 | 10/1983 |
| EP | 0 091 555 B1 | 10/1983 |
| FR | 2 534 268 A1 | 4/1984 |
| GB | 2359316 A * | 8/2001 |
| RU | 2110537 | 5/1998 |
| RU | 2176261 | 11/2001 |
| SU | 1022981 | 6/1983 |
| SU | 1472475 | 4/1989 |
| SU | 1661185 | 7/1991 |
| WO | WO 01/09056 A1 | 2/2001 |
| WO | WO 02/48063 A2 | 6/2002 |

OTHER PUBLICATIONS

Santamarina et al., "Soil Behaviour: The Role of Particle Shape", Proc. Skempton Conf., (Mar. 2004), pp. 1-14, London.

Society of Petroleum Engineers, SPE 30500 "Use of Hollow Glass Spheres for Underbalanced Drilling Fluids", SPE Annual Technical Conference & Exhibition, Dallas, Texas, Oct. 22-25, 1995, pp. 511-520.

Society of Petroleum Engineers, SPE 38637 "Field Application of LightWeight Hollow Glass Sphere Drilling Fluid", SPE $72^{nd}$ Annual Technical Conference & Exhibition, San Antonio, Texas, Oct. 5-8, 1997, pp. 699-707.

Society of Petroleum Engineers, SPE 62899 "Field Application of Glass Bubbles as a Density-Reducing Agent", SPE Annual Technical Conference & Exhibition, Dallas, Texas, Oct. 1-4, 2000, pp. 115-126.

Wong et al., "Use of Hollow Glass Bubbles as a Density Reducing Agent for Drilling", CADE/CAODC Drilling Conference, Oct. 23-24, 2001, Calgary, Alberta Canada, Paper No. 2001-31, Canadian Association of Drilling Engineers, pp. 1-14.

* cited by examiner

DRILLING FLUID CONTAINING MICROSPHERES AND USE THEREOF

This application is a continuation-in-part of U.S. Ser. No. 11/036,712, filed Jan. 14, 2005, now abandoned; which is a continuation of U.S. Ser. No. 10/218,962, filed Aug. 14, 2002, now U.S. Pat. No. 6,906,009, the disclosure of which is incorporated by reference in their entirety herein.

This invention relates to a novel drilling fluid composition and use thereof in drilling wells for petroleum and natural gas.

BACKGROUND

In oil drilling operations, a drilling fluid is circulated downwardly through a drill string to cool and lubricate the drill string, suspend the cutting removed from the well bore and to keep out formation fluids. The drilling fluid containing the suspending cuttings are further circulated upwardly through the annulus between the drill string and wall of the well bore to the surface, where the cutting are separated and the recycled drilling fluid is circulated down the bore. Drilling fluids, also known as drilling muds, may be oil- or water-based. Both water-based and oil-based drilling fluid systems are known. The more economical water-based systems are used when practicable with oil-based systems being used where increased lubricity at the drilling head is desirable or when traversing formations which would be adversely affected by a water-based system, such as water soluble shale formations.

A conventional oil-based drilling fluid (mud) generally comprises an oil fluid vehicle, such as a diesel oil, emulsifiying agents, such as alkaline soaps of fatty acids, wetting agents or surfactants, such as dodecylbenzene sulfonate, water, generally as a NaCl or $CaCl_2$ brine, and a viscosifying agent, such as an amine treated clay. Oil-base fluids may have an aromatic or aliphatic oil, or a mixture of oils, as the continuous phase. These oils may include diesel, mineral or synthetic (PAO, esters, ether) oil. They may be comprised entirely of oil or, more commonly, may contain water ranging from 5% to upwards of 50-60%. In the latter case, water becomes the internal phase, is emulsified into the oil as a heterogeneous fine dispersion, and the resulting system is referred to as an oil-based or oil-invert emulsion fluid.

A water-based drilling fluid comprises a viscosifying agent, generally a clay such as a solid phase bentonite attapulgite or sepiolite, and a water fluid vehicle. In addition, salt or salt water can be added to the components of the drilling fluid to prepare a salt water based drilling fluid. Numerous different additives to this drilling fluid are also employed to control viscosity, yield point, gel strength (thixotropic properties), pH, fluid loss, tolerance to contaminants such as salt and calcium carbonate, lubricating properties, filter caking properties, cooling and heat transfer properties, and tolerance to inactive solids such as sand and silt or active native mud making clays such as smectites, illites, kaolinites, chlorites, etc. Clays are not usually used as the sole viscosifying agent and typically organic water-soluble polymers such as starch, carboxymethylcellulose, natural gums or synthetic resins are used in conjunction with clays. These polymers also aid the clay component of the drilling fluid to serve as a filtration aid to prevent or retard the drilling fluid from being lost into the formation.

A number of drilling fluid formulations have been described. For example, U.S. Pat. No. 3,726,850 discloses a lignin dispersing agent for dispersing clays, and the like. The lignin dispersing agent is reported to have utility in both alkaline and acidic media. A relatively low viscosity aqueous silicate solution is disclosed in U.S. Pat. No. 3,746,109, and is reported to be particularly useful in drilling through shale formations. U.S. Pat. No. 4,799,549 discloses a stable, gel-forming microemulsion comprising an aqueous solution of an alkali metal silicate, a gelling reagent, and a surface-active agent (surfactant). This composition is reported to be useful for permanent or reversible plugging or clogging of subterranean formations. Also, U.S. Pat. No. 5,374,361 discloses a composition for cleaning out cased wellbores, and the like, using a fluid that includes a caustic alkyl polyglycoside surfactant formulation. This formulation is reported to be more biodegradable than previous detergent systems. A further additive encountered in aqueous drilling fluids is a metal compound, such as that described in U.S. Pat. No. 5,399,548, or a derivative of a metal compound such as a hydroxy-aluminum compound provided in a polymer, such as disclosed in U.S. Pat. No. 4,045,357. U.S. Pat. No. 5,333,698 also discloses a drilling fluid additive in combination with a white non-toxic mineral oil.

Although oil- and water-based drilling fluids are widely used, they require large, complex pumps to circulate the fluid down the drill string and up the annulus of the well bore. As the drill is operated, the resulting cuttings from the drill bit are suspended in the drilling fluid, thereby increasing the density and further increasing the pumping costs. In offshore well the hydrostatic pressure put additional strain on the pumping equipment and further increase the pumping costs. These cost associated with use and maintenance of these pumps contribute significantly to the costs of oil drilling operations. Further, the increased pressures and loads on the pumps make it difficult to maintain the pressure of the drilling fluid in the optimal range; between that of the pore pressure and the fracture pressure.

Several methods have been proposed to reduce the costs and overcome the problems associated with pumping drilling fluids. Shell E&P has introduced the Shell Subsea Pumping System (SSPS) whereby the drilling fluid is processed, cuttings removed and discharged at the seafloor, and gas separated prior to being pumped back to the surface. Conoco has developed a dual gradient system called Subsea Mudlift in which the drilling mud is removed from the riser with triplex pumps at the seafloor, and is then filled with seawater to reduce the riser load. Another approach called DeepVision, by Baker-Hughes and Transocean Sedco Forex uses centrifugal pumps to separate the mud at the seafloor and send it to the surface.

Some well operators have used a gas injection system to reduce the density of the drilling mud. In this system a gas such as nitrogen is added to the drilling fluid, which is circulated in the conventional manner. However due to the compressible nature of gas, large volumes and high pressures are required to maintain a gas phase in the mud, increasing the complexity and cost of the system and maintaining the appropriate pressures in the well bore. Mud/gas systems have shown a tendency to foam at the reduced pressures encountered as the mud/gas system ascends the well bore or riser causing fluid handling problems. In addition, small amounts of oxygen in the injected gas have led to corrosion problems.

To overcome the problems associated with gas injections systems, the use of hollow microspheres has been proposed. Hollow microspheres, being relatively incompressible, do not require the high pressures and associated pumps necessary with gas injection and the addition of microspheres will not lead to the foaming problems. However, improperly handled, and the size shape, density and particle size distribution can provide a nuisance dusty environment. Further, the microspheres can be difficult to efficiently separate and recycle from the drilling fluid, adding cost and complexity to their use.

SUMMARY OF THE INVENTION

The present invention provides a drilling fluid composition comprising a drilling fluid vehicle, which may be oil- or water-based, and a composite microsphere component. The microspheres of the composite microsphere component may comprise any hollow microspheres of glass, ceramic or plastic that may be added to the drilling fluid (with other components of the drilling fluid known in the art) to reduce the density thereof. Generally the composite microsphere component is added to the drilling composition in amounts sufficient to reduce the density at least 15%, preferably at least 20% and most preferably at least 30%. In one embodiment, the microsphere component is added in amounts sufficient to reduce the density of the mud to about that of the ambient seawater, or about 8 to 13 lbs/gallon (5.2 to 7.5 kg/L). In another embodiment, the microsphere component may comprise 25 to 50 volume percent of the drilling fluid composition. Such reduction in the density of the drilling fluid greatly reduces the pressures required to raise the drilling fluid to the surface, and reduces the associated pumping costs.

The composite microsphere component comprises a composite of microspheres and a polymeric resin. The composite microsphere component may be of any suitable size and shape. The composite may comprise pellets having a continuous polymeric phase having the microspheres dispersed therein, or the composite microsphere component may comprise an agglomerate of microspheres bound together by a discontinuous phase of polymeric resin. The polymeric resin may be a thermoplastic or thermoset resin. Composites having an intermediate structure between pellets and agglomerates are also contemplated.

Pellets comprising a continuous phase of polymeric resin generally comprise 20 to 75 weight % microspheres in the polymeric resin binder. The pellets may range in size from 200 to 4000 micrometers and have densities in the range of 0.4 to 1.0 g/cm$^3$. Agglomerates comprise sufficient polymeric resin to bind a plurality of microspheres in randomly shaped composite particles of about 200 to 4000 micrometers and having densities of 0.4 to 0.7 g/cm$^3$. Generally the agglomerates comprise 40 to 90 weight % of the microspheres. Microsphere composites having sizes in excess of about 7 mm may contribute to pumping problems.

The compressive strength required of the composite microsphere component used in drilling applications is dictated by the depth of water at which it will be employed: at shallow depths, the compressive strength of microsphere component does not have to be high, but at very great depths under the sea, the hydrostatic pressure exerted on the microsphere component becomes enormous, and the microsphere component should have very high resistance to compression (high compressive strengths). Hollow microspheres, because of their spherical form, provide resistance to compression equally from all directions (isotropic compressive strength), and are ideally suited for this application. Generally, the microsphere component has a collapse strength of at least 4000 psi (27.6 MPa), preferably at least 5000 psi (34.5 MPa) to provide an essentially incompressible density-reducing additive, in contrast to conventional gas-injection processes.

For underwater applications, the microsphere component should have sufficient hydrolytic stability, and the resin type is chosen accordingly. Preferred resins exhibit excellent hydrolytic stability, and in addition, offer outstanding compressive strengths. Strong resins and strong low-density hollow glass microspheres can be advantageously used to meet the stringent requirements of deep water drilling applications.

The present invention also provides a method of drilling comprising the step of circulating a drilling fluid down a drill string and up an annulus between the drill string and bore hole, and introducing a microsphere component to said drilling fluid in an amount sufficient to reduce the density thereof. The method may further comprise the step of separating the composite microsphere component from the drilling fluid composition and drill cuttings and the drilling fluid is returned to the surface. To facilitate separation, the microsphere component is preferably at least 200 micrometers in size.

The present invention also provides a method of reducing the density of the drilling fluid composition by adding a composite microsphere component to the drilling fluid composition in amounts sufficient to reduce the density at least 15%, preferably at least 20% and most preferably at least 30%. In one embodiment, the microsphere component is added in amounts sufficient to reduce the density of the mud to about that of the ambient seawater, or about 8 to 13 lbs/gallon (5.2 to 7.5 kg/L).

The invention provides a reduced density drilling fluid composition and method of drilling that advantageously reduces the density of the fluid and reduces costs associated with pumping. The invention uses conventional drilling and pumping equipment, requires no sea floor based pumps and may be easily pressure-controlled to maintain the pressure of the fluid to that of the ambient water pressure. More specifically, the pressure of the fluid may be maintained between fracture pressure and the pore pressure of the well to avoid fracturing the well formation and/or reduce the infiltration of water (or other fluids) from the pores of the well formation.

Advantageously the use of a composite microsphere component overcomes problems inherent in gas-injection processes by providing an essentially incompressible additive that may be used to reduce the density of a drilling fluid. The composites also allow one to specifically tailor the density, strength and size of the additive to the specific well drilling requirements and facilitates separation due to the larger size (as compared to unitary microspheres).

DETAILED DESCRIPTION

The microspheres used in the composite microsphere component may be any type of hollow spheres that are known to the art. The microspheres are preferably made of glass, but may be made be polymeric, ceramic or other materials known to the art, provided the microsphere component has sufficient physical properties to withstand the severe conditions encountered in well drilling, including collapse strength, hydrolytic stability, size, density and compatibility with polymeric resins.

Useful microspheres (of the composite) are hollow, generally round but need not be perfectly spherical; they may be cratered or ellipsoidal, for example. Such irregular, though generally round or spherical, hollow products are regarded as "microspheres" herein.

The microspheres of the composite are generally from about 5 to 1000 micrometers in diameter, and are preferably 50 and 500 micrometers in diameter. Microspheres comprising different sizes or a range of sizes may be used. Where the microsphere component comprises a composite of microspheres and a resin, for example in the form of an agglomerate or a pellet, the size of the unitary microspheres is less significant since the composite particle may be sized appropriately to facilitate separation and recovery.

As the microspheres are subjected to high pressures in a well, the microspheres should have a collapse strength in excess of the anticipated pressures. Generally the microsphere component should have a burst strength in excess of 4000 psi (27.6 MPa), preferably in excess 5000 psi (34.5 MPa) as measured by ASTM D3102-78 with 10% collapse and percent of total volume instead of void volume as stated in the test.

The density of the microspheres may vary from about 0.1 to 0.9 g/cm$^3$, and is preferably in the range of 0.2 to 0.7 g/cm$^3$. When a microsphere composite is used, the agglomerate having a discontinuous phase of polymeric resin may have densities in the range of 0.4 to 0.7 g/cm$^3$, and composite pellets having a continuous phase of polymeric resin, may have densities in the range of 0.4 to 1.0 g/cm$^3$.

Glass microspheres have been known for many years, as is shown by European Patent 0 091,555, and U.S. Pat. Nos. 2,978,340, 3,030,215, 3,129,086 3,230,064, and U.S. Pat. No. 2,978,340, all of which teach a process of manufacture involving simultaneous fusion of the glass-forming components and expansion of the fused mass. U.S. Pat. Nos. 3,365315 (Beck), 4,279,632 (Howell), 4,391,646 (Howell) and U.S. Pat. No. 4,767,726 (Marshall) teach an alternate process involving heating a glass composition containing an inorganic gas forming agent, and heating the glass to a temperature sufficient to liberate the gas and at which the glass has viscosity of less than about $10^4$ poise.

Useful glass microspheres have a density of at least 0.1 gram per cubic centimeter, which is equivalent to a ratio of wall thickness to bubble diameter of about 0.029. Density is determined (according to ASTM D-2840-69) by weighing a sample of microspheres and determining the volume of the sample with an air comparison pycnometer (such as a Accu-Pyc 1330 Pycnometer or a Beckman Model 930). Higher densities can produce higher strengths, and densities of 0.5 or 0.6 g/cm$^3$ or more are preferred for some uses. The microspheres generally have an average diameter between about 5 and 1000 micrometers, and preferably between about 50 and 500 micrometers. Size can be controlled by the amount of sulfur-oxygen compounds in the particles, the length of time that the particles are heated, and by other means known in the art. The microspheres may be prepared on apparatus well known in the microspheres forming art, e.g., apparatus similar to that described in U.S. Pat. Nos. 3,230,064 or 3,129,086.

One method of preparing glass microspheres is taught in U.S. Pat. No. 3,030,215, which describes the inclusion of a blowing agent in an unfused raw batch of glass-forming oxides. Subsequent heating of the mixture simultaneously fuses the oxides to form glass and triggers the blowing agent to cause expansion. U.S. Pat. No. 3,365,315 describes an improved method of forming glass microspheres in which pre-formed amorphous glass particles are subsequently reheated and converted into glass microspheres. U.S. Pat. No. 4,391,646 discloses that incorporating 1-30 weight percent of $B_2O_3$, or boron trioxide, in glasses used to form microspheres, as in U.S. Pat. No. 3,365,315, improves strength, fluid properties, and moisture stability. A small amount of sodium borate remains on the surface of these microspheres, causing no problem in most applications. Removal of the sodium borate by washing is possible, but at a significant added expense; even where washing is carried out, however, additional sodium borate leaches out over a period of time.

Hollow glass microspheres are preferably prepared as described in U.S. Pat. No. 4,767,726 (Marshall), incorporated herein by reference, due to the greater hydrolytic stability. These microspheres are made from a borosilicate glass and have a chemical composition consisting essentially of $SiO_2$, CaO, $Na_2O$, $B_2O_3$, and $SO_3$ blowing agent. A characterizing feature of the microspheres resides in the alkaline metal earth oxide:alkali metal oxide ($RO:R_2O$) ratio, which substantially exceeds 1:1 and lies above the ratio present in any previously utilized simple borosilicate glass compositions. As the $RO:R_2O$ ratio increases above 1:1, simple borosilicate compositions become increasingly unstable, devitrifying during traditional working and cooling cycles, so that "glass" compositions are not possible unless stabilizing agents such as $Al_2O_3$ are included in the composition. Such unstable compositions have been found to be highly desirable for making glass microspheres, rapid cooling of the molten gases by water quenching, to form frit, preventing devitrification. During subsequent bubble forming, as taught in aforementioned U.S. Pat. Nos. 3,365,315 and 4,391,646, the microspheres cool so rapidly that devitrification is prevented, despite the fact that the $RO:R_2O$ ratio increases even further because of loss of the relatively more volatile alkali metal oxide compound during forming.

These microspheres have a density ranging from 0.08 or less to about 0.8 g/cc, the less dense products being more economical per unit volume. Glass microspheres having a higher density are, however, particularly useful in the present invention where an inexpensive and comparatively lightweight microspheres having high resistance to crushing is desired. These microspheres, in which the chemical composition, expressed in weight percent, consists essentially of at least 70% $SiO_2$, 8-15% RO, 3-8% $R_2O$, 2-6% $B_2O_3$, and 0.125-1.50% $SO_3$, the foregoing components constituting at least about 90% (preferably 94% and still more preferably 97%) of the glass, the $RO:R_2O$ weight ratio being in the range of 1.2-3.5.

Preparation of hollow, ceramic microspheres by spray drying is taught in U.S. Pat. No. 4,421,562. U.S. Pat. No. 4,637,990 describes hollow, ceramic, porous microspheres prepared by a blowing technique. The resultant ceramic microspheres have diameters of 2000 to 4000 micrometers.

U.S. Pat. No. 4,279,632 discloses a method and apparatus for producing concentric hollow spheres by a vibration technique on extruded materials to break up the material into individual, spherical bodies. This method is useful with low melting point material such as glass or metal which is fluid at elevated operating temperatures.

Hollow ceramic balls prepared by a combination of coating, sintering, and reduction are disclosed in U.S. Pat. No. 4,039,480; however, the process is complex, and the balls so obtained are large (e.g., 5 by 7 mesh size which is 2.79 to 3.96 millimeters).

Ceramic metal oxide microspheres prepared by impregnating hollow, organic resin microspheres with a metal compound and firing to remove adjuvants is disclosed in U.S. Pat. No. 3,792,136. The resultant hollow microspheres generally have large diameters of 50 micrometers to 10 millimeters (mm) and in one example, when the average diameter was 3 mm, the wall thickness is disclosed to be 17 micrometers.

U.S. Pat. No. 2,978,340 describes inorganic microspheres prepared from a fusion (melt or vitreous) process using a gassing agent. The product is not uniform in size, and the microspheres are not all hollow.

Hollow ceramic spheres of low density may be prepared by the process taught in U.S. Pat. Nos. 4,111,713, and 4,744,831, which comprises (A) tumbling together and thoroughly mixing (1) solidifiable liquid globules comprising a thermally fugitive organic binder material and a source of void-forming agent adapted to evolve as a gas and convert the liquid globules to a hollow condition and (2) a mass of minute discrete free-flowing inorganic heat-sinterable parting agent particles selected from metals, metalloids, metal oxides and metal salts that are wetted by, and at least partially absorbed into, the liquid globules during the tumbling action; sufficient parting agent particles being present so that any portion of liquid globules uncovered by parting agent particles tumble against discrete unabsorbed parting agent particles;

(B) providing conditions during the tumbling action, and tumbling for a sufficient time, for the void-forming agent to evolve as a gas and form a central interior space within the liquid globules and for the thus-hollowed liquid globules to solidify;

(C) collecting the converted globules after they have solidified to a shape-retaining condition; and (D) firing the hollow spheres to first burn out the organic binder, and to then sinter the parting agent particles to form hollow shape-retaining spheres.

Another useful ceramic microsphere is taught in U.S. Pat. No. 5,077,241 (Moh, et al.) which comprises microspheres consisting essentially of at least one of a non-oxide component (or phase) and an oxide component (or phase), each microsphere having a ceramic wall and a single central cavity, the microspheres having diameters in the range of 1 to 300 micrometers and wall thicknesses of less than 10 percent of the diameter of the microspheres. Such ceramic microspheres may be prepared by (1) providing a mixture containing a ceramic sol precursor and a volatile liquid, the volatile liquid being referred to herein as bloating agent, (2) adding the above mixture, preferably as droplets, at a suitable rate and manner to a provided bubble promoting medium maintained at a suitable temperature to allow formation of green hollow microspheres; preferably the bubble promoting medium is a liquid such as an aliphatic alcohol, e.g. oleyl alcohol, or a long chain carboxylic acid ester such as peanut oil, or mixtures thereof, or mixtures of oleyl alcohol with other vegetable oils or vegetable oil derivatives, (3) isolating the green microspheres, preferably by filtration, and (4) firing the green microspheres, optionally mixed with an agglomeration preventative agent to provide a source of carbon, in air for oxide containing ceramic microspheres or in an inert or reducing atmosphere for non-oxide containing microspheres, and at a range of temperature sufficient to convert the green microspheres into an oxide or non-oxide containing ceramic.

Useful polymeric microspheres may be prepared by the general method of polymerization of polymeric particles having a minor amount of a volatile blowing agent dissolved within the particles which expands on heating. U.S. Pat. No. 3,615,972 (Morehouse et al.) describes thermoplastic microspheres that encapsulate a liquid blowing agent. The microspheres are prepared by suspension polymerization of droplets of a mixture of monomer(s) and a blowing agent. U.S. Pat. No. 3,472,798 (Pitchforth et al.) described the preparation of polymethylmethacrylate prepared by suspension polymerization. U.S. Pat. No. 3,740,359 (Garner) and U.S. Pat. No. 4,075,138 (Garner) describes vinylidine chloride copolymer microspheres prepared from an oil phase of the monomers and a liquid blowing agent, dispersing the oil phase in an aqueous phase containing a dispersion stabilizer, polymerizing the monomers, then heating to volatilize the blowing agent. U.S. Pat. No. 3,945,956 (Garner) described expandable styrene-acrylonitrile microspheres prepared by polymerizing a mixture of styrene and acrylonitrile with a volatile liquid blowing agent.

The microsphere component may comprise a composite comprising a plurality of hollow glass, ceramic or plastic microspheres bonded together with a polymeric binder. The binder may be continuous (as in a particle or pellet), or discontinuous (as in an agglomerate) or an intermediate structure. As such, the amount of microspheres in the composite can vary widely; from about 20 to 75, preferably 20 to 60 weight % to form a pellet composite and 40 to 95, preferably 40 to 90 weight % to form an agglomerate. The microsphere composites may be of any suitable size or shape are typically at least 200 micrometers in size, and preferably 4000 micrometers or less to facilitate subsequent separation from the drilling fluid. The composites may be any desired shape including random or regular shapes.

Thermoplastic polymers may be used as a binder in the composite microsphere. Thermoplastic polymers which may be used in the present invention include but are not limited to melt-processible polyolefins and copolymers and blends thereof, styrene copolymers and terpolymers (such as Kraton™), ionomers (such as Surlyn™), ethyl vinyl acetate (such as Elvax™), polyvinylbutyrate, polyvinyl chloride, metallocene polyolefins (such as Affinity™ and Engage™), poly (alpha olefins) (such as Vestoplast™ and Rexflex™), ethylene-propylene-diene terpolymers, fluorocarbon elastomers (such as THV™ from 3M Dyneon), other fluorine-containing polymers, polyester polymers and copolymers (such as Hytrel™), polyamide polymers and copolymers, polyurethanes (such as Estane™ and Morthane™), polycarbonates, polyketones, and polyureas. The thermoplastic polymers include blends of homo- and copolymers, as well as blends of two or more homo- or copolymers. As used herein "melt-processible" refers to thermoplastic polymers having a melt index of from 3 to 30 g/10 min.

Useful polyamide polymers include, but are not limited to, synthetic linear polyamides, e.g., nylon-6 and nylon-66, nylon-11, or nylon-12. It should be noted that the selection of a particular polyamide material might be based upon the physical requirements of the particular application for the resulting reinforced composite article. For example, nylon-6 and nylon-66 offer higher heat resistant properties than nylon-11 or nylon-12, whereas nylon-11 and nylon-12 offer better chemical resistant properties. In addition to those polyamide materials, other nylon materials such as nylon-612, nylon-69, nylon-4, nylon-42, nylon-46, nylon-7, and nylon-8 may also be used. Ring containing polyamides, e.g., nylon-6T and nylon-61 may also be used. Polyether containing polyamides, such as PEBAX polyamides (Atochem North America, Philadelphia, Pa.), may also be used.

Polyurethane polymers which can be used include aliphatic, cycloaliphatic, aromatic, and polycyclic polyurethanes. These polyurethanes are typically produced by reaction of a polyfunctional isocyanate with a polyol according to well-known reaction mechanisms. Commercially available urethane polymers useful in the present invention include: PN-04 or 3429 from Morton International, Inc., Seabrook, N.H., and X4107 from B.F.Goodrich Company, Cleveland, Ohio.

Also useful are polyacrylates and polymethacrylates which include, for example, polymers of acrylic acid, methyl acrylate, ethyl acrylate, acrylamide, methylacrylic acid, methyl methacrylate, n-butyl acrylate, and ethyl acrylate, to name a few.

Other useful substantially extrudable hydrocarbon polymers include polyesters, polycarbonates, polyketones, and polyureas. These materials are generally commercially available, for example: SELAR® polyester (DuPont, Wilmington, Del.); LEXAN® polycarbonate (General Electric, Pittsfield, Mass.); KADELL® polyketone (Amoco, Chicago, Ill.); and SPECTRIM® polyurea (Dow Chemical, Midland, Mich.).

Useful fluorine-containing polymers include crystalline or partially crystalline polymers such as copolymers of tetrafluoroethylene with one or more other monomers such as perfluoro(methyl vinyl)ether, hexafluoropropylene, perfluoro(propyl vinyl)ether; copolymers of tetrafluoroethylene with ethylenically unsaturated hydrocarbon monomers such as ethylene, or propylene.

Still other fluorine-containing polymers useful in the invention include those based on vinylidene fluoride such as polyvinylidene fluoride; copolymers of vinylidene fluoride with one or more other monomers such as hexafluoropropylene, tetrafluoroethylene, ethylene, propylene, etc. Still other useful fluorine-containing extrudable polymers will be known to those skilled in the art as a result of this disclosure.

Representative examples of polyolefins useful in this invention are polyethylene, polypropylene, polybutylene, poly(1-butene), poly(3-methylbutene), poly(4-methylpentene) and copolymers of ethylene with propylene, 1-butene, 1-hexene, 1-octene, 1-decene, 4-methyl-1-pentene and 1-octadecene, and blends thereof. Useful commercially available polyolefins include MOPLEN and ADFLEX KS359 polypropylene available from Basell, Bloomington, Del., SRC 7644 polypropylene available from ExxonAMobil, Edison, N.J.

Representative blends of polyolefins useful in this invention are blends containing polyethylene and polypropylene, low-density polyethylene and high-density polyethylene, and polyethylene and olefin copolymers containing the copolymerizable monomers, some of which are described above, e.g., ethylene and acrylic acid copolymers; ethyl and methyl acrylate copolymers; ethylene and ethyl acrylate copolymers; ethylene and vinyl acetate copolymers-, ethylene, acrylic acid, and ethyl acrylate copolymers, and ethylene, acrylic acid, and vinyl acetate copolymers.

The useful thermoplastic polyolefins may also comprise functionalized polyolefins, i.e., polyolefins that have additional chemical functionality, obtained through either copolymerization of olefin monomer with a functional monomer or graft copolymerization subsequent to olefin polymerization. Typically, such functionalized groups include O, N, S, P, or halogen heteroatoms. Such reactive functionalized groups include carboxylic acid, hydroxyl, amide, nitrile, carboxylic acid anhydride, or halogen groups. Many functionalized polyolefins are available commercially. For example, copolymerized materials include ethylene-vinyl acetate copolymers, such as the Elvax series, commercially available from DuPont Chemicals, Wilmington, Del., the Elvamide series of ethylene-polyamide copolymers, also available from DuPont, and Abcite 1060WH, a polyethylene-based copolymer comprising approximately 10% by weight of carboxylic acid functional groups, commercially available from Union Carbide Corp., Danbury, Conn. Examples of graft-copolymerized functionalized polyolefins include maleic anhydride-grafted polypropylene, such as the Epolene series commercially available from Eastman Chemical Co., Kingsport, Tenn. and Questron, commercially available from Himont U.S.A., Inc., Wilmington, Del.

Thermoplastic microsphere composites can be prepared using any conventional technique for preparing particle-filled thermoplastic articles. The thermoplastic polymer can be heated above its melting point and the microspheres can then be mixed in. The resulting mixture may then be extruded or formed into continuous strands and the strands are cooled to solidify the moldable polymer for pelletizing on suitable equipment as is known in the art. Alternatively, a molten mixture of thermoplastic polymer and microsphere may be discharged using a pelletizing spray apparatus as is known in the art.

In a preferred method of making a microsphere composite, the microspheres, preferably glass microspheres are metered into a molten stream of thermoplastic polymer under low shear conditions to form a mixture, and the mixture is then formed into the desired size and shape. This process may comprise a two-stage extrusion process whereby a thermoplastic polymer is melted in the first stage of an extruder and conveyed to a second stage, where the microspheres are added to the molten stream. The microspheres and the thermoplastic resin are mixed in the second stage, the mixture degassed and extruded in the desired form.

Thermoset polymers may be used as the binder for the composite microsphere. As used herein, thermoset refers to a polymer that solidifies or sets irreversibly when cured. Curable binder precursor can be cured by radiation energy or thermal energy. Thermosettable compositions may include components that have a radiation or heat crosslinkable functionality such that the composition is curable upon exposure to radiant curing energy in order to cure and solidify, i.e. polymerize and/or crosslink, the composition. Representative examples of radiant curing energy include electromagnetic energy (e.g., infrared energy, microwave energy, visible light, ultraviolet light, and the like), accelerated particles (e.g., electron beam energy), and/or energy from electrical discharges (e.g., coronas, plasmas, glow discharge, or silent discharge).

Radiation crosslinkable functionality refers to functional groups directly or indirectly pendant from a monomer, oligomer, or polymer backbone that participate in crosslinking and/or polymerization reactions upon exposure to a suitable source of radiant curing energy. Such functionality generally includes not only groups that crosslink via a cationic mechanism upon radiation exposure but also groups that crosslink via a free radical mechanism. Representative examples of radiation crosslinkable groups suitable in the practice of the present invention include epoxy groups, (meth)acrylate groups, olefinic carbon-carbon double bonds, allylether groups, styrene groups, (meth)acrylamide groups, combinations of these, and the like.

Typically, radiation curable binder precursor material comprises at least one of epoxy resin, acrylated urethane resin, acrylated epoxy resin, ethylenically unsaturated resin, aminoplast resin having at least one pendant unsaturated carbonyl group, isocyanurate derivatives having at least one pendant acrylate group, isocyanate derivatives having at least one pendant acrylate group, or combinations thereof. Other suitable thermoset polymers include those derived from phenolic resins, vinyl ester resins, vinyl ether resins, urethane resins, cashew nut shell resins, napthalinic phenolic resins, epoxy modified phenolic resins, silicone (hydrosilane and hydrolyzable silane) resins, polyimide resins, urea formaldehyde resins, methylene dianiline resins, methyl pyrrolidinone resins, acrylate and methacrylate resins, isocyanate resins, unsaturated polyester resins, and mixtures thereof.

A polymer precursor or precursors may be provided to form the desired thermoset polymer. The polymer precursor or thermoset resin may comprise monomers, or may comprise a partially polymerized, low molecular weight polymer, such as an oligomer, if desired. Solvent or curative agent, such as a catalyst, may also be provided where required. In one method, the microsphere composite may be prepared by mixing the microspheres with a polymer precursor or resin and subsequently curing the polymer precursor or resin. A solvent, if any, may be removed by evaporation. The evaporation and polymerization may take place until the polymerization is substantially complete.

Epoxy (epoxide) monomers and prepolymers are commonly used in making thermoset epoxy materials, and are well known in the art. Thermosettable epoxy compounds can be cured or polymerized by cationic polymerization. The epoxy-containing monomer can also contain other epoxy compounds or blends of epoxy containing monomers with thermoplastic materials. The epoxy-containing monomer may be blended with specific materials to enhance the end use or application of the cured, or partially cured, composition.

Useful epoxy-containing materials include epoxy resins having at least one oxirane ring polymerizable by a ring opening reaction. Such materials, broadly called epoxides, include both monomeric and polymeric epoxides, and can be aliphatic, cycloaliphatic, or aromatic. These materials generally have, on the average, at least two epoxy groups per molecule, and preferably have more than two epoxy groups per molecule. The average number of epoxy groups per molecule is defined herein as the number of epoxy groups in the epoxy-containing material divided by the total number of epoxy molecules present. Polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy-containing material may vary from 58 to about 100,000 or more. Mixtures of various epoxy-containing materials can also be used.

Examples of some epoxy resins useful in this invention include 2,2-bis[4-(2,3-epoxypropyloxy)phenyl]propane (diglycidyl ether of bisphenol A) and materials under the trade designation "EPON 828", "EPON 1004" and "EPON 1001F", commercially available from Shell Chemical Co., Houston, Tex., "DER-331", "DER-332" and "DER-334", commercially available from Dow Chemical Co., Freeport, Tex., Other suitable epoxy resins include glycidyl ethers of phenol formaldehyde novolac (e.g., "DEN-431" and "DEN-428", commercially available from Dow Chemical Co.) and BLOX 220 thermoplastic epoxy resin available from Dow, Midland, Mich. The epoxy resins used in the invention can polymerize via a cationic mechanism with the addition of appropriate photoinitiator(s). These resins are further described in U.S. Pat. Nos. 4,318,766 and 4,751,138, which are incorporated by reference.

Exemplary acrylated urethane resin includes a diacrylate ester of a hydroxy terminated isocyanate extended polyester or polyether. Examples of commercially available acrylated urethane resin include "UVITHANE 782" and "UVITHANE 783," both available from Morton Thiokol Chemical, Moss Point, Mass., and "CMD 6600", "CMD 8400", and "CMD 8805", all available from Radcure Specialties, Pampa, Tex.

Exemplary acrylated epoxy resin includes a diacrylate ester of epoxy resin, such as the diacrylate ester of an epoxy resin such as bisphenol. Examples of commercially available acrylated epoxy resin include "CMD 3500", "CMD 3600", and "CMD 3700", available from Radcure Specialties.

Exemplary ethylenically unsaturated resin includes both monomeric and polymeric compounds that contain atoms of carbon, hydrogen and oxygen, and optionally, nitrogen or the halogens. Oxygen atoms, nitrogen atoms, or both, are generally present in ether, ester, urethane, amide, and urea groups. Ethylenically unsaturated resin typically has a molecular weight of less than about 4,000 and is in one embodiment an ester resulting from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Representative examples of other useful acrylates include methyl methacrylate, ethyl methacrylate, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, and pentaerythritol tetraacrylate. Other useful ethylenically unsaturated resins include monoallyl, polyallyl, and polymethylallyl esters and amides of carboxylic acids, such as diallyl phthalate, diallyl adipate, and N,N-diallyladipamide. Still, other useful ethylenically unsaturated resins include styrene, divinyl benzene, and vinyl toluene. Other useful nitrogen-containing, ethylenically unsaturated resins include tris(2-acryloyl-oxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

Some useful aminoplast resins can be monomeric or oligomeric. Typically, the aminoplast resins have at least one pendant $\alpha,\beta$-unsaturated carbonyl group per molecule. These $\alpha,\beta$-unsaturated carbonyl groups can be acrylate, methacrylate, or acrylamide groups. Examples of such resins include N-hydroxymethyl-acrylamide, N,N'-oxydimethylenebisacrylamide, ortho and para acrylamidomethylated phenol, acrylamidomethylated phenolic novolac, and combinations thereof. These materials are further described in U.S. Pat. Nos. 4,903,440 and 5,236,472, which are incorporated by reference.

Useful isocyanurate derivatives having at least one pendant acrylate group and isocyanate derivatives having at least one pendant acrylate group are further described in U.S. Pat. No. 4,652,274, which is incorporated by reference. One such isocyanurate material is a triacrylate of tris(2-hydroxyethyl) isocyanurate.

Examples of vinyl ethers suitable for this invention include vinyl ether functionalized urethane oligomers, commercially available from Allied Signal, Morristown, N.J., under the trade designations "VE 4010", "VE 4015", "VE 2010", "VE 2020", and "VE 4020".

Phenolic resins are low cost, heat resistant, and have excellent physical properties. Acid cure resole phenolic resins are disclosed in U.S. Pat. No. 4,587,291. Phenol resins used in some embodiments of the invention can have a content of monomeric phenols of less than 5%. The resins can also be modified additionally with up to 30% of urea, melamine, or furfuryl alcohol, according to known methods.

Phenol resoles are alkaline condensed, reaction products of phenols and aldehydes, wherein either mono- or polynuclear phenols may be used. In further detail, mononuclear phenols, and both mono- and polyfunctional phenols, such as phenol itself, and the alkyl substituted homologs, such as o-, m-, p-cresol or xylenols, are suitable. Also suitable are halogen-substituted phenols, such as chloro- or bromophenol and polyfunctional phenols, such as resorcinol or pyrocatechol. The term "polynuclear phenols" refers, for example, to naphthols, i.e., compounds with fused rings. Polynuclear phenols may also be linked by aliphatic bridges or by heteroatoms, such as oxygen. Polyfunctional, polynuclear phenols may also provide suitable thermosetting phenyl resoles.

The aldehyde component used to form the phenol resoles can be formaldehyde, acetaldehyde, propionaldehyde, or butyraldehyde, or products that release aldehyde under condensation conditions, such as, for example, formaldehyde bisulfite, urotropin, trihydroxymethylene, paraformaldehyde, or paraldehyde. The stoichiometric quantities of phenol and aldehyde components can be in the ratio of 1:1.1 to 1:3.0. The resins can be used in the form of aqueous solutions with a content of non-volatile substances of 60 to 85%.

Oxetane ring monomers may also be used to form the matrix phase thermoset polymers. Oxetane (oxacyclobutane) rings behave somewhat like epoxy (oxirane) rings in that catalysts and/or co-curatives, sometimes referred to as crosslinking agents, can be used to open the ring and link two or more chains together to form a crosslinked polymer. For example, polycarboxylic acid anhydrides and other polyfunctional compounds such as polyamines, polycarboxylic acids, polymercaptans, polyacid halides, or the like are capable of linking two or more oxetane sites just as epoxy sites are linked by epoxide cocuratives. The result is an increased amount of three-dimensional structure in the crosslinked or cured polymer, and hence an increased amount of rigidity of the polymer structure.

The mixture of microspheres and curable binder precursor material may be cured by an initiator selected from the group consisting of photoinitiator, thermal initiator, and combinations thereof. As used herein, a thermal initiator may be used when thermal energy is used in the at least partially curing step, and photoinitiators may be used when ultraviolet and/or visible light is used in the at least partially curing step. The requirement of an initiator may depend on the type of the curable binder precursor used and/or the type of energy used in the at least partially curing step (e.g., electron beam or ultraviolet light). For example, phenolic-based curable binder precursors typically do not require the addition of an initiator when at least thermally cured. However, acrylate-based curable binder precursors typically do require the addition of an initiator when at least thermally cured. As another example, initiators typically are not required when electron beam energy is used during the at least partially curing step. However, if ultraviolet or visible light is utilized, a photoinitiator is typically included in the composition.

Upon being exposed to thermal energy, a thermal initiator generates a free radical source. The free radical source then initiates the polymerization of the curable binder precursor. Exemplary thermal initiators include organic peroxides (e.g. benzoil peroxide), azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Azo compounds suitable as thermal initiators in the present invention may be obtained under the trade designations "VAZO 52, " "VAZO 64, " and "VAZO 67" from E.I. duPont deNemours and Co., Wilmington, Del.

Upon being exposed to ultraviolet or visible light, the photoinitiator generates a free radical source or a cationic source. This free radical or cationic source then initiates the polymerization of the curable binder precursor.

Exemplary photoinitiators that generate a free radical source when exposed to ultraviolet light include, but are not limited to, those selected from the group consisting of organic peroxides (e.g., benzoyl peroxide), azo compounds, quinones, benzophenones, nitroso compounds, acyl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Examples of photoinitiators that generate a free radical source when exposed to visible radiation are further described, for example, in U.S. Pat. No. 4,735,632 (Oxman et al.), the disclosure of which is incorporated herein by reference.

Cationic photoinitiators generate an acid source to initiate the polymerization of an epoxy resin or a urethane. Exemplary cationic photoinitiators include a salt having an onium cation and a halogen-containing complex anion of a metal or metalloid. Other useful cationic photoinitiators include a salt having an organometallic complex cation and a halogen-containing complex anion of a metal or metalloid. These photoinitiators are further described in U.S. Pat. No. 4,751,138 (Tumey et al.), the disclosure of which is incorporated herein by reference. Another example is an organometallic salt and an onium salt described in U.S. Pat. No. 4,985,340 (Palazotto et al.); the disclosure of which is incorporated herein by reference. Still other cationic photoinitiators include an ionic salt of an organometallic complex in which the metal is selected from the elements of Periodic Groups IVB, VB, VIB, VIIB, and VIIIB. These photoinitiators are further described in U.S. Pat. No. 5,089,536 (Palazotto), the disclosure of which is incorporated herein by reference.

Ultraviolet-activated photoinitiators suitable for the present invention may be obtained under the trade designations "IRGACURE 651", "IRGACURE 184", "IRGACURE 369" and "IRGACURE 819" from Ciba Geigy Company, Winterville, Mass., "Lucirin TPO-L", from BASF Corp., Livingston, N.J., and "DAROCUR 1173" from Merck & Co., Rahway, N.J. In one embodiment, the total amount of initiator (either photoinitiator, thermal initiator, or combinations thereof) may be in the range from 0.1 to 10 percent by weight of the curable binder precursor; in another embodiment, from about 1 to about 5 percent by weight of the curable binder precursor. If both photoinitiator and thermal initiator are used, the ratio of photoinitiator to thermal initiator is between about 3.5:1 to about 1:1.

When using a thermoset resin, the microsphere composite may be prepared by forming precursor particles comprising the thermoset resin binder and microspheres and curing the particles. In a preferred embodiment, the first step involves forcing the binder and microspheres through a perforated substrate to form agglomerate precursor particles. Next, the agglomerate precursor particles are separated from the perforated substrate and irradiated with radiation energy to provide agglomerate particles. In a preferred embodiment, the method of forcing, separating and irradiating steps are spatially oriented in a vertical and consecutive manner, and are performed in a sequential and continuous manner. Preferably, the agglomerate particles are solidified and handleable after the irradiation step and before being collected. Reference may be made to U.S. Pat. No. 6,620,214 and incorporated herein by reference.

Methods of forcing the binder precursor and solid particulates through a perforated substrate comprise extrusion, milling, calendering or combinations thereof. In a preferred embodiment, the method of forcing is provided by a size reduction machine, manufactured by Quadro Engineering Incorporated.

In one embodiment, the agglomerate precursor particles are irradiated by being passing through a first curing zone that contains a radiation source. Preferred sources of radiation comprise electron beam, ultraviolet light, visible light, laser light or combinations thereof. In another embodiment, the agglomerate particles are passed through a second curing zone to be further cured. Preferred energy sources in the second curing zone comprise thermal, electron beam, ultraviolet light, visible light, laser light, microwave or combinations thereof.

The composite particles are generally non-spherical. In some embodiments of the invention the composite particles will have a sphericity of less than about 0.7, generally less than about 0.6, and preferably less than about 0.5, as measured according to American Petroleum Institute Method RP56, Section 5.

In a preferred embodiment, the composite particles are filamentary shaped and have a length ranging from about 100 to about 5000 micrometers and sphericity less than 0.7 (prior to sizing). Most preferably, the filamentary shaped composite particles range in length from about 200 to about 1000 micrometers. In one embodiment, the agglomerate particles may then be reduced in size after either the first irradiation step or after being passed through the second curing zone. The preferred method of size reducing is with a size reduction machine manufactured by Quadro Engineering Incorporated. In one embodiment, the cross-sectional shapes of the agglomerate particles comprise circles, polygons or combinations thereof. Preferably, the cross-sectional shape is constant. Further details regarding the process may be found in U.S. Pat. No. 6,620,214, incorporated herein by reference.

Agglomerates that contain a discontinuous binder can be made according to the following procedure. The microspheres and the binder resin are introduced into a mixing vessel. The resulting mixture is stirred until it is homogeneous. It is preferred that there be sufficient liquid in the mixture that the resulting mixture is neither excessively stiff nor excessively runny. Most resins contain sufficient liquid to permit adequate mixing. After the mixing step is complete, the mixture is caused to solidify, preferably by means of heat or radiation energy. Solidification results from either the removal of liquid from the mixture or the polymerization of the resinous adhesive. After the mixture is solidified, it is crushed to form agglomerates, which are then graded to the desired size. Devices suitable for this step include conventional jaw crushers and roll crushers.

If the binder of the agglomerate is a thermoplastic, it is preferred that the agglomerate be made according to the following procedure. The thermoplastic is heated to just above its melting temperature. Then the heated thermoplastic and the microspheres are introduced into a heated screw type extruder, and mixed until it is homogeneous. Next, the mixture is run through the die of the extruder, and the resulting extrudate is cooled and crushed to form agglomerates, which are then graded to the desired size.

The crushing and grading procedures described above frequently provide agglomerates of an undesirable size. The improperly sized agglomerates can either be recycled, e.g., by being added to a new dispersion, or discarded.

The present invention provides a drilling fluid composition comprising a drilling fluid, which may be oil- or water-based, and a composite microsphere component. The microsphere component comprises a composite of microspheres in a polymeric resin. The microsphere of the composite microsphere component may comprise any hollow microspheres of glass, ceramic or plastic that may be added to the drilling fluid (with other components of the drilling fluid known in the art) to reduce the density thereof. The composite microsphere component may be of any suitable size and shape. The polymeric resin may comprise a continuous phase having the microspheres dispersed therein, or the composite microsphere component may comprise an agglomerate of microspheres bound together by a discontinuous phase of polymeric resin. The polymeric resin may be a thermoplastic or thermoset resin.

The composite microsphere component is added to the drilling fluid composition in amounts sufficient to reduce the density of the drilling fluid at least 15%, preferably at least 20% and most preferably at least about 30%. Normally the drilling fluid has a density in the range of about 15 lbs/gal (~8.7 kg/L). One useful drilling fluid comprises a microsphere component in an amount sufficient to reduce the density of the drilling to approximately that of seawater, or about 8 to 12 lbs/gal (~5.2 to 7 kg/L). The amount of microsphere component added to a drilling fluid will depend on the density of the microsphere component, the initial density of the drilling fluid (without a microsphere component) and the desired final density of the drilling fluid. For example, reducing the density of a 16 lbs/gallon drilling fluid to a 10 lbs/gallon would require the addition of about 45 volume percent (or about 18 weight percent) of a microsphere component having a density of about 0.4 g/cm$^3$.

The present invention also provides a method of drilling comprising the step of circulating a drilling fluid down a drill string and up an annulus between the drill string and bore hole, and introducing a microsphere component to said drilling fluid in an amount sufficient to reduce the density thereof. The drilling fluid is delivered at a sufficient volumetric rate and pressure of effect said circulation down said drill string, out a drill bit and up the annular space The microsphere component may be added to the drilling fluid at the surface and circulated down the drill string and up the annulus of the well bore. Preferably, the microsphere component is pumped in a fluid vehicle, such as water, and pressure injected into the annulus between the drill string and the well bore to reduce the density of the drilling fluid that has been pumped from the surface down the drill string. In such a case, the microsphere component does not come into contact with the high shear environment of the drill bit. If desired, the microsphere component may be injected at multiple points along the annulus from the seabed to the surface.

In the method of the present invention, the pressure of the drilling fluid may be controlled to prevent blowouts, kicks or other uncontrolled pressure conditions. Under most well drilling applications in permeable formations, the drilling fluid pressure should be kept between pore pressure of the well and the fracturing pressure of the surround well formation. If the fluid pressure is too low, the formation fluid can force the fluid from the well-bore or annulus resulting in a kick or blowout. If the fluid pressure is too high the formation adjacent the well bore may fracture resulting in loss of fluid circulation and loss of fluid and cuttings to the fracture.

If desired, the method may further include a separation step whereby the microsphere component is separated from the recovered fluid. Such a separation step may include a preceding or subsequent step where the drill cuttings are separated to the recovered fluid. Such a microsphere component separation step may include a screening step, where the microsphere component is screened from both larger and smaller components of the recovered fluid. For example, the returning drilling fluid may first be screened to remove cuttings and subsequently screened to remove the microsphere component. With such a screening step, it is preferably that the size of the microsphere component be micrometers or more. Alternatively the separation step may comprise a flotation step where the microsphere component is recovered by floating to the surface of the recovered fluid due to the low density. As yet another alternative, the microsphere component may be separated from the recovered fluid by a centrifugal or cyclonic means whereby the returning drilling fluid is fed to a hydrocyclone and rapidly spun so that heavier density materials, such as cuttings are separated from light components, such as the microsphere, by centrifugal and centripetal forces.

The following examples are provided to illustrates some embodiments of the invention and are not intended to limit the scope of the claims. All percentages are by weight unless otherwise noted.

EXAMPLES

Glossary

A-174 Silane; 3-(trimethoxysilyl)propyl methacrylate, available from Dow Corning; Midland Mich.

Adflex™ KS-359; polyproplylene available from Basell, Wilmington, Del.

Blox™ 220; high adhesion thermoplastic epoxy resin, Dow Chemical Co., Midland, Mich.

Cumene hydroperoxide; $C_6H_5C(CH_3)_2OOH$; available from Sigma-Aldirch, Milwaukee, Wis.

Irgacure™ 651; Methylbenzoylbenzoate, available from Ciba Specialty Chemicals, Tarrytown, N.Y.

Lexan 123™; polycarbonate available from General Electric, Pittsfield, Mass.

Moplen™; Polypropylene available from Basell, Wilmington, Del.

SRC 7644™; Polypropylene available from Exxon/Mobil, Edison, N.J.

SR 351™; Trimethylolpropane triacrylate, available from Sartomer, Exton, Pa.

RD 710™; Phenolic resin, available from 3M Company, St. Paul, Minn.

Test Methods

Glass Microsphere Strength Test

An APP strength tester (available from Advanced Pressure Products, Ithaca, N.Y.) was used to determine the collapse strength of the microsphere component. The sample to be tested was suspended in glycerol and placed in a balloon. The balloon was then inserted into the strength tester and pressure is applied until the specified percentage of microspheres are ruptured (ASTM D3102-78 with 10% collapse and percent of total volume instead of void volume).

Glass Microsphere Size Measurement Test

The size distribution of each batch of glass microspheres was determined using Model 7991-01 Particle Size Analyzer (Leeds and Northrup, Pittsburgh, Pa.).

Glass Microsphere Density Determination Test

A fully automated gas displacement AccuPyc 1330 Pycnometer (available from Micromeritic, Norcross, Ga.) was used to determine the density of the glass microspheres according to ASTM D-2840-69.

Preparation of Glass Microspheres

The process that was followed for making glass microspheres is essentially described in U.S. Pat. No. 4,391,646 (Howell; Example 1) and the composition of the glass used is described in U.S. Pat. No. 4,767,726 (Marshall; Example 8). Glass microspheres used to make composites typically had a 90% size range of 10 µm-60 µm with a density of 0.4 g/cm³.

Preparation of Extruded Microsphere Composite

Various thermoplastic materials were co-extruded with glass microspheres using a 33 mm co-rotating twin screw extruder (Sterling Extruder Corporation, Plainfield, N.J.) with a length to diameter ratio of 24:1, multiple feed ports fitted with an underwater pelletizer (Gala Industries, Eagle Rock, Va.). Two volumetric feeders (Accurate Dry Materials Feeder, Whitewater, Wis.) were used to feed additives into the extruder with a screw speed of 250 rpm resulting in a die output rate of 5.7 pounds/hr (~2.6 kg/hr). The material was fed in a polymer/glass microspheres weight ratio of 12.7/7.3. The compounding temperature range from hopper to die is cited in Table 1 below. Pelletized material is dried at room temperature for several days before packaging.

TABLE 1

| Example | Polymer | Temp range (° C.) | Density (g/cm³) | Strength (psi @ 10% loss) | Strength (psi @ 20% loss) | Strength (@ 19,900 psi; % loss) |
|---|---|---|---|---|---|---|
| 1 | Blox ™ 220 | 50-200 | 0.958 | +20,000 | +20,000 | 5.7 |
| 2 | Moplen ™ | 50-220 | 0.677 | 6,500 | 9,500 | 32.7 |
| 3 | SRC 7644 ™ | 50-220 | 0.686 | 4,750 | 6.050 | 41.9 |
| 4 | Adflex ™ KS-359 | 50-220 | 0.669 | 1,400 | 4,800 | 38.8 |
| 5 | Lexan 123 ™ | 50-260 | 0.912 | 17,600 | +20,000 | 16 |

The strength values in Table 1 show that composites of all polymers exhibited suitable strength for drilling applications.

Examples 6-10

Absorbency of Composites to Drilling Fluids

For Examples 6-10 composite microspheres (1.0 g) were placed in drilling fluids (10.0 g; available from Halliburton Energy Services) as identified in Table 2. The sample was allowed to set at room temperature for four days. The mixtures were then filtered through a 250 mesh screen, and the solid composite microsphere material was allowed to drain for 1 hour. The composite microsphere sample was then weighed ($w_f$) and % wt gain was calculated using the formula:

$$\% \text{ Wt Gain} = \frac{w_f - 1.0}{1.0} \times 100$$

Results are listed in Table 2.

TABLE 2

% weight gain of microsphere composites in various drilling fluids.

| Example | Polymer | % Wt Gain Petrofree | % Wt Gain Petrofree LV | % Wt Gain Petrofree SF | % Wt Gain LVT 200 |
|---|---|---|---|---|---|
| 6 | Blox ™ 220 | 6.3 | 3.0 | 4.8 | 3.4 |
| 7 | Moplen ™ | 13.6 | 15.7 | 17.8 | 13.9 |
| 8 | SRC 7644 | 17.7 | 18.5 | 22.9 | 28.6 |
| 9 | Adflex ™ KS-359 | 55.1 | 57.5 | 65.2 | 93.0 |
| 10 | Lexan ™ | 2.0 | 4.3 | 1.7 | 1.0 |

Examples 11-13

Preparation of Composite Microspheres with Acrylate Polymers

The composites were prepared as described in U.S. Pat. No. 6,620,214.

Procedure #1: General Procedure for Making a Composite Microsphere Precursor Slurry A slurry was prepared by thoroughly mixing glass microspheres, acrylate resin, and initiators, using a mixer (obtained from Hobart Corporation, Troy, Ohio; model number A120T). Specific formulation can be found in Table 3. The abrasive slurry was mixed in the mixer on low speed using a flat-beater style impeller for 30 minutes and heated to a temperature within the range from about 90° F. (32° C.) to about 120° F. (49° C.) due to mechanical heating and heat of reaction. At this point, the abrasive slurry was very thick with cement-like handling characteristics. The mixed slurry was then placed in a refrigerator for at least 45 minutes to cool before further processing. The temperature of the refrigerator was in the range from about 40° F. (4° C.) to about 45° F. (7° C.).

Procedure #2: General Procedure for Making Composite Microsphere Precursor Particles The composite microsphere precursor slurry was formed into aggregate precursor particles with the aid of the "QUADRO COMIL" material forming apparatus (obtained from Quadro Incorporated, Milbourne, N.J. under the trade designation "QUADRO COMIL"; model number 197). Depending on the desired cross sectional shape of the composite microsphere precursor particles, different shaped orifices were used. Conical 10 screens with circular shaped hole orifices were used to produce composite microsphere precursor particles with circular shaped cross sections.

The slurry was added to the hopper of the "QUADRO COMIL" by hand while the impeller was spinning at a preset speed (rpm) of 350. The rotating impeller forced the slurry through the orifices in the conical screen and when a critical length (typically, a critical length is reached when the weight of the particle is greater than any adhesive force between the formed composition and the perforated substrate) was reached, the filamentary shaped composite microsphere precursor particles separated from the outside of the screen, and fell by gravity through a UV curing chamber (obtained from Fusion UV Systems, Gaithersburg, Md.; model #DRE 410 Q) equipped with two 600 watt "d" Fusion lamps set at "high" power. The composite microsphere precursor particles were at least partially cured by exposure to the UV radiation and thereby converted into handleable and collectable particles.

In some of the examples below the composite microsphere precursor particles were further at least partially cured by placing the particles in aluminum pans and at least partially thermally curing them in a forced-air oven (obtained from Lindberg/Blue M Company, Watertown, Wis.; model number POM-246F) for about 5 hours to about 8 hours and at about 340° F. (171° C.) to about 360° F. (182° C.). Optionally, the at least partially cured composite microsphere precursor particles were reduced in size by passing them through the "QUADRO COMIL". Typically, particles are reduced in size by passing them through the "QUADRO COMIL," with the "QUADRO COMIL" equipped with conical screens that have relatively larger orifices than those used for forming composite microsphere precursor particles (see examples for specific details). For particle size reduction, the impeller rotation speed of the "QUADRO COMIL" was set at 252 rpm. Results of Density and Strength testing are listed in Table 4.

Example 14

Preparation of Composite Microspheres with Phenolic Resins

Example 14 was prepared essentially following the procedures described above in Preparation of Composite Microspheres with Acrylate Polymers with the exception that the slurry composition in Procedure #1 is replaced with the composition cited in Table 5 and the microsphere precursor particles in Procedure #2 are subjected to temperatures at about 260° F. (127° C.) to about 280° F. (138° C.) for 10-30 minutes instead of temperatures at at about 340° F. (171° C.) to about 360° F. (182° C.) for 5-8 hours to effect thermal cure. Results of Density and Strength testing are listed in Table 6.

TABLE 3

Composition of Acrylate Composite Microsphere Slurries

| Material | Example 11 (g) | Example 12 (g) | Example 13 (g) |
|---|---|---|---|
| SR351™ | 225 | 225 | 275 |
| Cumene hydroperoxide | 2.5 | 2.5 | 2.5 |
| Glass microspheres | 500 | 450 | 400 |
| A-174 | 45 | 45 | 45 |
| Irgacure 651 | 2.5 | 2.5 | 2.5 |

TABLE 4

Densities and Strengths of Acrylate Composite Microspheres.

| Example | Density (g/cm$^3$) | Strength (psi @ 10% loss) | Strength (psi @ 20% loss) |
|---|---|---|---|
| 11 | 0.5359 | 5200 | 6400 |
| 12 | 0.5315 | 4550 | 5600 |
| 13 | 0.6109 | 8650 | 11,300 |

TABLE 5

Composition of Phenolic Composite Microsphere Slurry

| Material | Example 14 (g) |
|---|---|
| Glass microspheres | 425.0 |
| 710 phenolic resin | 225.0 |
| DI water | 30.0 |

TABLE 6

Densities and Strengths of Phenolic Composite Microspheres.

| Example | Density (g/cm$^3$) | Strength (psi @ 10% loss) | Strength (psi @ 20% loss) |
|---|---|---|---|
| 14 | 0.5332 | 5800 | 10,850 |

The invention claimed is:

1. A drilling fluid composition comprising a fluid component, a viscosifying component and a composite microsphere component in an amount sufficient to reduce the density of the composition, wherein said composite microsphere component comprise pellets comprising a continuous phase of polymeric resin binder and microspheres dispersed therein, wherein the composite microsphere component has a sphericity of less than 0.7 and a density of 0.4 to 0.7 g/cm$^3$.

2. The composition of claim 1 wherein the size of said pellets is from 200 to 4000 micrometers.

3. The composition of claim 1 wherein said pellets comprise 20 to 75 wt. % microspheres.

4. The composition of claim 1 wherein said pellets comprise 20 to 60 wt. % microspheres.

5. The composition of claim 1 wherein said microspheres of said composite microsphere component comprises glass, ceramic or polymeric hollow microspheres.

6. The composition of claim 5, wherein the density of said microspheres is from 0.1 to 0.9 g/cm$^3$.

7. The composition of claim 5, wherein the density of said microspheres is from 0.2 to 0.7 g/cm³.

8. The composition of claim 1 wherein said composite microsphere component is in amounts sufficient to reduce the density of said composition to 8 to 13 pounds/gallon (5.2 to 7.5 kg/L).

9. The composition of claim 5 wherein said microspheres are unitary glass microspheres.

10. The composition of claim 5 wherein the density of said glass microspheres is from about 0.2 to 0.7 g/cm³.

11. The composition of claim 5 wherein said unitary glass microspheres are from 5 to 1000 micrometers in diameter.

12. The composition of claim 5 wherein said unitary glass microspheres are from 100 to 1000 micrometers in diameter.

13. The composition of claim 1 wherein the composite microsphere component is at least 200 micrometers in size.

14. The composition of claim 1 wherein said resin binder is a thermoplastic or thermoset resin.

15. The composition of claim 14 wherein said thermoplastic is selected from polyolefin homo- and copolymers; styrene copolymers and terpolymers; ionomers; ethyl vinyl acetate homo- and copolymers; polyvinylbutyrate homo- and copolymers; polyvinyl chloride homo- and copolymers; metallocene polyolefins ; poly(alpha olefins) homo- and copolymers; ethylene-propylene-diene terpolymers; fluorocarbon elastomers; polyester polymers and copolymers; polyamide polymers and copolymers, polyurethane polymers and copolymers;

polycarbonate polymers and copolymers; polyketones; and polyureas; and blends thereof.

16. The composition of claim 14 wherein said thermoset resin is selected from epoxy resins, acrylated urethane resins, acrylated epoxy resins, ethylenically unsaturated resins, aminoplast resins, isocyanurate resins, phenolic resins, vinyl ester resins, vinyl ether resins, urethane resins, cashew nut shell resins, napthalinic phenolic resins, epoxy modified phenolic resins, silicone resins, polyimide resins, urea formaldehyde resins, methylene dianiline resins, methyl pyrrolidinone resins, acrylate and methacrylate resins, isocyanate resins, unsaturated polyester resins, and blends thereof.

17. The composition of claim 1, wherein the collapse strength of said composite microsphere component is 4000 psi (27.6 MPa) or greater.

18. The composition of claim 1 wherein the composite microsphere component comprises from 25 to 50 volume percent of said drilling fluid composition.

19. The composition of claim 1, wherein said viscosifying agent is selected from clays, starch, carboxymethylcellulose, natural gums or synthetic resins, and combinations thereof.

* * * * *

UNITED STATES PATENT AND TRADEMARK OFFICE
CERTIFICATE OF CORRECTION

PATENT NO. : 7,767,629 B2
APPLICATION NO. : 11/867482
DATED : August 3, 2010
INVENTOR(S) : Madeline P Shinbach et al.

It is certified that error appears in the above-identified patent and that said Letters Patent is hereby corrected as shown below:

Column 1,
Line 31, delete "emulsifiying" and insert -- emulsifying --.

Column 6,
Line 30, delete "$R_2$ O," and insert -- $R_2O$, --.
Line 30, delete "$B_2$ $O_3$," and insert -- $B_2O_3$, --.
Line 33, delete "$R_2$ O" and insert -- $R_2O$ --.

Column 7,
Line 62, delete "vinylidine" and insert -- vinylidene --.

Column 9,
Line 4, delete "KADELL®" and insert -- KADEL® --.
Line 28, delete "ExxonAMobil," and insert -- Exxon/Mobil, --.

Column 10,
Line 53, delete "napthalinic" and insert -- naphthalenic --.

Column 11,
Line 37, delete ""DER-334 "," and insert -- "DER-334", --.

Column 13,
Line 49, delete "52, " "VAZO 64, "" and insert -- 52," "VAZO 64," --.
Line 60, delete "triacrylimidazoles," and insert -- triarylimidazoles --.

Column 16,
Line 20, after "space" insert -- . --.

Column 17,
Line 11, delete "Aldirch" and insert -- Aldrich --.

Signed and Sealed this

Second Day of November, 2010

David J. Kappos
*Director of the United States Patent and Trademark Office*

Column 20,
Line 3, delete "at at" and insert -- at --.

Column 21,
Line 25, delete "polyolefins ;" and insert -- polyolefins; --.

Column 22,
Line 12, delete "napthalinic" and insert -- naphthalenic --.